US008046580B2

(12) United States Patent
Taylor (10) Patent No.: US 8,046,580 B2
(45) Date of Patent: Oct. 25, 2011

(54) DATA PROCESSING APPARATUS AND METHOD FOR GENERATION OF PROTECTION COMPRESSION ENCODED DATA

(75) Inventor: Andrew Robert Taylor, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 11/261,378

(22) Filed: Oct. 28, 2005

(65) Prior Publication Data

US 2006/0136723 A1    Jun. 22, 2006

(30) Foreign Application Priority Data

Nov. 1, 2004   (GB) .................................. 0424205.3

(51) Int. Cl.
*H04L 9/32* (2006.01)
(52) U.S. Cl. ....................................................... 713/168
(58) Field of Classification Search .................. 713/168
See application file for complete search history.

(56) References Cited

U.S. PATENT DOCUMENTS

| 6,037,984 A * | 3/2000 | Isnardi et al. ............. 375/240.21 |
| 2004/0017926 A1 * | 1/2004 | Tonisson ...................... 382/100 |
| 2004/0258243 A1 * | 12/2004 | Shin et al. ..................... 380/210 |

FOREIGN PATENT DOCUMENTS

| EP | 0 947 953 A2 | 10/1999 |
| JP | 10-164549 | 6/1998 |
| JP | 11-341268 | 12/1999 |
| JP | 2002-232687 | 8/2002 |
| JP | 2002-232698 | 8/2002 |

(Continued)

OTHER PUBLICATIONS

"Fast Watermarking of MPEG-1/2 Streams Using Compressed-domain Perceptual Embedding and a Generalized Correlator Detector", Simitopoulos et al., Published in the EURASIP Journal on Applied Signal Processing vol. 2004, No. 8, pp. 1088-1106, Jul. 2004.*

(Continued)

*Primary Examiner* — Edan Orgad
*Assistant Examiner* — Harris Wang
(74) *Attorney, Agent, or Firm* — Oblon, Spivak, McClelland, Maier & Neustadt, L.L.P.

(57) ABSTRACT

An encoding data processing apparatus is described which is operable to generate protected compression encoded data representative of protected media signals. The apparatus comprises a data analyser which is operable to receive compression encoded data representative of the media signals and to select low perceptibility data bits in the compression encoded data which when altered would have a relatively low perceivable effect on the media signals recovered from compression decoding the compression encoded data after the selected bits had been altered. The bits are selected in accordance with predetermined criteria. The apparatus also comprises an information validation engine which is operable to form a normalised version of the compression encoded data by setting the selected data bits in the compression encoded data to a predetermined value and to generate a secure hash value of the normalised version of the compression encoded data. The information validation engine then forms the protected compression encoded data by replacing the selected data bits of the normalised compression encoded data with the data bits of the secure hash value. By generating a secure hash of the normalised bitstream rather than the original bitstream, subsequent authentication of the bitstream to verify that the bitstream has not been changed becomes possible without increasing the size of the bitstream.

49 Claims, 6 Drawing Sheets

FOREIGN PATENT DOCUMENTS

| | | |
|---|---|---|
| JP | 2003-32641 | 1/2003 |
| JP | 2003-289435 | 10/2003 |
| JP | 2004-241869 | 8/2004 |
| WO | WO 02/101522 | 12/2002 |

OTHER PUBLICATIONS

"Oblivious Video Watermarking Scheme with Adaptive Embedding Mechanism", Quin-Ming Ge et al., Proceedings of the Second International Conference on Machine Learning and Cybernetics, Xi'an, Nov. 2-5, 2003, pp. 2876-2881.*

Rui Du, et al.. "Lossless Authentication of MPEG-2 Video", Proceedings from 2002 International Conference on Image Processing, IEEE, XP-002365069. vol. 2, 2002, 4 pages.

Ping Wah Wong, "A Public Key Watermark for Image Verification and Authentication", International Conference on Image Processing and Its Applications, XP-002108799, vol. 1, No. 1, Oct. 4, 1998, pp. 455-459.

F. Deguillaume, "Secure hybrid robust watermarking resistant against tampering and copy attack", Signal Processing, XP-004452923, vol. 83. No. 10, Oct. 2003, pp. 2133-2170.

A. J. Menezes, et al., "Handbook of Applied Cryptography, passage", Handbook of Applied Crytography, CRC, Press Series on Discrete Mathematices and Its Applications, XP-002334708, 1997, pp. 33, 358-368.

Office Action issued May 17, 2011 in Japanese Patent Application No. 2005-318868 with English translation (5 pages).

* cited by examiner

| Run | Level | Code |
|---|---|---|
| 0 | 1 | 1s * |
| | 1 | 11s ** |
| | 2 | 0100s |
| | 3 | 00101s |
| | 4 | 0000110s |
| | 5 | 00100110s |
| | 6 | 00100001s |
| | 7 | 0000001010s |
| | 8 | 000000011101s |
| | 9 | 000000011000s |
| | 10 | 000000010011s |
| | 11 | 000000010000s |
| | 12 | 0000000011010s |
| | 13 | 0000000011001s |
| | 14 | 0000000011000s |
| | 15 | 0000000010111s |
| | 16 | 0000000011111s |
| | 17 | 0000000011110s |
| | 18 | 0000000011101s |
| | 19 | 0000000011100s |
| | 20 | 0000000011011s |
| | 21 | 0000000011010s |
| | 22 | 0000000011001s |
| | 23 | 0000000011000s |
| | 24 | 0000000010111s |
| | 25 | 0000000010110s |
| | 26 | 0000000010101s |
| | 27 | 0000000010100s |
| | 28 | 0000000010011s |
| | 29 | 0000000010010s |
| | 30 | 0000000010001s |
| | 31 | 0000000010000s |
| | 32 | 00000000011000s |
| | 33 | 00000000010111s |
| | 34 | 00000000010110s |
| | 35 | 00000000010101s |
| | 36 | 00000000010100s |
| | 37 | 00000000010011s |
| | 38 | 00000000010010s |
| | 39 | 00000000010001s |
| | 40 | 00000000010000s |

1010, 1020, 1030

| Run | Level | Code |
|---|---|---|
| 1 | 1 | 011s |
| | 2 | 000110s |
| | 3 | 00100101s |
| | 4 | 0000001100s |
| | 5 | 000000011011s |
| | 6 | 0000000010110s |
| | 7 | 0000000010101s |
| | 8 | 00000000011111s |
| | 9 | 00000000011110s |
| | 10 | 00000000011101s |
| | 11 | 00000000011100s |
| | 12 | 00000000011011s |
| | 13 | 00000000011010s |
| | 14 | 00000000011001s |
| | 15 | 00000000010011s |
| | 16 | 00000000010010s |
| | 17 | 00000000010001s |
| | 18 | 00000000010000s |
| 2 | 1 | 0101s |
| | 2 | 0000100s |
| | 3 | 0000001011s |
| | 4 | 000000010100s |
| | 5 | 0000000010100s |
| 3 | 1 | 00111s |
| | 2 | 00100100s |
| | 3 | 000000011100s |
| | 4 | 0000000010011s |
| 4 | 1 | 00110s |
| | 2 | 0000001111s |
| | 3 | 000000010010s |
| 5 | 1 | 000111s |
| | 2 | 0000001001s |
| | 3 | 000000010010s |
| 6 | 1 | 000101s |
| | 2 | 000000011110s |
| | 3 | 0000000000010100s |

1040, 1050

| Run | Level | Code |
|---|---|---|
| 7 | 1 | 000100s |
| | 2 | 000000010101s |
| 8 | 1 | 0000111s |
| | 2 | 000000010001s |
| 9 | 1 | 0000101s |
| | 2 | 0000000010001s |
| 10 | 1 | 00100111s |
| | 2 | 0000000010000s |
| 11 | 1 | 00100011s |
| | 2 | 00000000000011010s |
| 12 | 1 | 00100010s |
| | 2 | 00000000000011001s |
| 13 | 1 | 00100000s |
| | 2 | 00000000000011000s |
| 14 | 1 | 0000001110s |
| | 2 | 00000000000010111s |
| 15 | 1 | 0000001101s |
| | 2 | 00000000000010110s |
| 16 | 1 | 0000001000s |
| | 2 | 00000000000010101s |
| 17 | 1 | 000000001111s |
| 18 | 1 | 000000011010s |
| 19 | 1 | 000000011001s |
| 20 | 1 | 000000010111s |
| 21 | 1 | 000000010110s |
| 22 | 1 | 0000000011111s |
| 23 | 1 | 0000000011110s |
| 24 | 1 | 0000000011101s |
| 25 | 1 | 0000000011100s |
| 26 | 1 | 0000000011011s |
| 27 | 1 | 00000000000011111s |
| 28 | 1 | 00000000000011110s |
| 29 | 1 | 00000000000011101s |
| 30 | 1 | 00000000000011100s |
| 31 | 1 | 00000000000011011s |

| Special | Code |
|---|---|
| End-of-Block | 10 |
| Escape | 000001 |

\* First coefficient of a non-intra block only
\*\* Not first coefficient in a non-intra block Sign bit s is 0 for positive and 1 for negative

Table 1060/1070/1080 (Run 0):

| Run | Level | Code |
|---|---|---|
| 0 | 1 | 10s |
|  | 2 | 110s |
|  | 3 | 0111s |
|  | 4 | 11100s |
|  | 5 | 11101s |
|  | 6 | 000101s |
|  | 7 | 000100s |
|  | 8 | 1111011s |
|  | 9 | 1111100s |
|  | 10 | 00100011s |
|  | 11 | 00100010s |
|  | 12 | 11111010s |
|  | 13 | 11111011s |
|  | 14 | 11111110s |
|  | 15 | 11111111s |
|  | 16 | 000000000111111s |
|  | 17 | 000000000111110s |
|  | 18 | 000000000111101s |
|  | 19 | 000000000111100s |
|  | 20 | 000000000110111s |
|  | 21 | 000000000011010s |
|  | 22 | 000000000011001s |
|  | 23 | 000000000011000s |
|  | 24 | 000000000010111s |
|  | 25 | 000000000010110s |
|  | 26 | 000000000010101s |
|  | 27 | 000000000010100s |
|  | 28 | 000000000010011s |
|  | 29 | 000000000010010s |
|  | 30 | 000000000010001s |
|  | 31 | 000000000010000s |
|  | 32 | 000000000011000s |
|  | 33 | 000000000010111s |
|  | 34 | 000000000010110s |
|  | 35 | 000000000010101s |
|  | 36 | 000000000010100s |
|  | 37 | 000000000010011s |
|  | 38 | 000000000010010s |
|  | 39 | 000000000010001s |
|  | 40 | 000000000010000s |

Table 1090/1100 (Runs 1-6):

| Run | Level | Code |
|---|---|---|
| 1 | 1 | 010s |
|  | 2 | 00110s |
|  | 3 | 1111001s |
|  | 4 | 00100111s |
|  | 5 | 00100000s |
|  | 6 | 0000000010110s |
|  | 7 | 0000000010101s |
|  | 8 | 000000000011111s |
|  | 9 | 000000000011110s |
|  | 10 | 000000000011101s |
|  | 11 | 000000000011100s |
|  | 12 | 000000000011011s |
|  | 13 | 000000000011010s |
|  | 14 | 000000000011001s |
|  | 15 | 000000000010011s |
|  | 16 | 000000000010010s |
|  | 17 | 000000000010001s |
|  | 18 | 000000000010000s |
| 2 | 1 | 00101s |
|  | 2 | 0000111s |
|  | 3 | 11111100s |
|  | 4 | 0000001100s |
|  | 5 | 0000000010100s |
| 3 | 1 | 00111s |
|  | 2 | 00100110s |
|  | 3 | 000000001100s |
|  | 4 | 0000000010011s |
| 4 | 1 | 000110s |
|  | 2 | 11111101s |
|  | 3 | 000000010010s |
| 5 | 1 | 000111s |
|  | 2 | 000000100s |
|  | 3 | 0000000010010s |
| 6 | 1 | 0000110s |
|  | 2 | 000000011110s |
|  | 3 | 0000000000010100s |

Table (Runs 7-31):

| Run | Level | Code |
|---|---|---|
| 7 | 1 | 0000100s |
|  | 2 | 000000010101s |
| 8 | 1 | 0000101s |
|  | 2 | 000000010001s |
| 9 | 1 | 1111000s |
|  | 2 | 0000000010001s |
| 10 | 1 | 1111010s |
|  | 2 | 0000000010000s |
| 11 | 1 | 00100001s |
|  | 2 | 00000000000011010s |
| 12 | 1 | 00100101s |
|  | 2 | 00000000000011001s |
| 13 | 1 | 00100100s |
|  | 2 | 00000000000011000s |
| 14 | 1 | 000000101s |
|  | 2 | 00000000000010111s |
| 15 | 1 | 000000111s |
|  | 2 | 00000000000010110s |
| 16 | 1 | 0000001101s |
|  | 2 | 00000000000010101s |
| 17 | 1 | 000000011111s |
| 18 | 1 | 000000011010s |
| 19 | 1 | 000000011001s |
| 20 | 1 | 000000010111s |
| 21 | 1 | 000000010110s |
| 22 | 1 | 000000011111s |
| 23 | 1 | 000000011110s |
| 24 | 1 | 000000011101s |
| 25 | 1 | 000000011100s |
| 26 | 1 | 000000011011s |
| 27 | 1 | 00000000000011111s |
| 28 | 1 | 00000000000011110s |
| 29 | 1 | 00000000000011101s |
| 30 | 1 | 00000000000011100s |
| 31 | 1 | 00000000000011011s |

| Special | Code |
|---|---|
| End-of-Block | 0110 |
| Escape | 000001 |

Sign bit s is 0 for positive and 1 for negative

DATA PROCESSING APPARATUS AND METHOD FOR GENERATION OF PROTECTION COMPRESSION ENCODED DATA

FIELD OF THE INVENTION

The present invention relates to a data processing apparatus and method for validating compressed data. Embodiments of the invention can provide an encoding data processing apparatus and method, and a decoding data processing apparatus and method for generating validated compression encoded data representative of validated media signals.

BACKGROUND OF THE INVENTION

It is desirable when disseminating digital compressed data to prevent unauthorised alteration of the compressed data. Copy protection and authentication techniques for addressing this undesirable behaviour include public/private key encryption and the use of hash generated digital signatures. Example non-alteration techniques using real-time labelling of digital video data are described in the paper "Real-time Labelling of MPEG-2 Compressed Video" by Gerrit C. Langelaar, Reginald L. Lagendijk and Jan Biemond of Delft University of Technology, The Netherlands.

SUMMARY OF INVENTION

An object of the present invention is to provide an arrangement for authenticating a compression encoded bit stream.

A further object of the present invention is to provide an arrangement for verifying that a compression encoded bitstream has not been changed without increasing the size of the bitstream.

According to a first aspect of the present invention, there is provided an encoding data processing apparatus which is operable to generate protected compression encoded data representative of protected media signals. The apparatus comprises a data analyser which is operable to receive compression encoded data representative of the media signals and to select low perceptibility data bits in the compression encoded data which when altered would have a relatively low perceivable effect on the media signals recovered from compression decoding the compression encoded data after the selected bits had been altered. The bits are selected in accordance with predetermined criteria The apparatus also comprises an information validation engine which is operable to form a normalised version of the compression encoded data by setting the selected data bits in the compression encoded data to a predetermined value and to generate a secure hash value of the normalised version of the compression encoded data. The information validation engine then forms the protected compression encoded data by replacing the selected data bits of the normalised compression encoded data with the data bits of the secure hash value.

A hash value may be generated from an input bitstream using a hash algorithm and comprises a unique fixed-length string of digits (typically 160 bits) known as a "message digest" that represents the original message. A hash value cannot be reverse engineered to determine the original message, and the same message digest will not usually be generated from two different inputs. Because of these properties, a hash value is particularly useful for uniquely identifying a bitstream, and may therefore be used to determine its authenticity, in particular whether the bitstream has been modified since the hash value was generated.

If, for the purpose of authentication, validation data such as a hash is to be added to a bitstream, this can be performed either by inserting the validation data into or at the beginning or end of the bitstream. This does not result in the loss of any data from the bitstream, but results in an increase in the length of the bitstream. Alternatively, existing data bits of the bitstream can be replaced with validation bits of the validation data This ensures that the bitstream remains the same length, but results in the loss of original data from the bitstream.

If a hash of a bitstream is generated before and then after modification of the bitstream, different hash values will be result in each case. Accordingly, if a hash value representing a bitstream is then embedded into the bitstream by replacing selected bits, the bitstream is thereby modified and a hash taken of the modified bitstream at a later time will produce a different value to the hash value carried in the bitstream itself.

The invention recognises that the data bits which are to be replaced with bits of the hash data should have the same value every time a hash is generated or else any hash-based authentication routine will always determine that a modification has taken place and that the bitstream is not authentic. Accordingly the present invention forms a normalised version of the compressed information signals in which the selected bits are all set to a predetermined known value. It is from this normalised version of the compressed information signals that the hash is generated. By generating and storing the hash in this way, the compression encoded data can be authenticated at a later time by determining which bits within the compression encoded data are the selected bits storing the hash value, extracting the stored hash value and setting the selected bits to the predetermined value used when initially generating the hash value to be stored. A hash is then taken of the compression encoded data with the bits set to their predetermined values. The newly generated hash value can then be compared with the extracted hash value to determine whether the compression encoded data has been altered. With this arrangement the embedding of the hash data within the compressed bitstream will not affect hash generation and will therefore not impede the authentication process.

To provide security, and prevent the hash value from being replaced, the hash value is encrypted. Many different forms of encryption could be used. For instance, the hash value may be digitally signed after its generation by encrypting it using a private key before embedding it into the compression encoded data to form the validated compressed information signals. A corresponding public key will then be required in order to decode the hash. Alternatively, the hash value could be generated in the form of a message authentication code, whereby it is generated not only on the basis of the compressed bitstream, but also on the basis of a secret key. In this case, the secret key will be required at a decoding apparatus in order to determine whether the compressed bitstream is valid and should be decoded. The former method of using private/public key encryption uses a two-step verification process, specifically the digital signature is verified and then the hash value itself is verified. Anyone is able to verify the data if they posses the public key corresponding to the private key used to encrypt the hash value. Further, digitally signing the hash results in a relatively large set of validation data to be inserted in the bitstream. For instance, the hash value itself may be 160 bits in length, and the corresponding digital signature may be around 1024 bits in length. In contrast, with the message authentication code method, a single verification step is required in order to determined whether the compressed bitstream has been altered, although this requires the secret key with which the message authentication code was generated and may therefore require the originator of the compressed bitstream to actually verify that no change has occurred. The message authentication code is however typically much smaller than a signed hash value, and may be for instance around 128 bits in length.

According to a second aspect of the present invention, there is provided a decoding data processing apparatus which is operable to validate protected media signals by decoding protected compression encoded data representative of the protected media signals. The apparatus receives protected compression encoded data containing validation data, the validation data having been calculated by identifying selected data bits in the compression encoded data in accordance with predetermined criteria which when altered would have a relatively low perceivable effect on the media signals, setting the selected data bits to a predetermined value to form a normalised version of the compression encoded data, calculating a secure hash value of the normalised version of the compression encoded data and replacing the selected data bits of the normalised version of the compression encoded data with the data bits of the secure hash value. The apparatus comprises a data analyser which operable to receive the protected compression encoded data and to identify selected data bits in the protected compression encoded data in accordance with the predetermined criteria The apparatus also comprises an authentication engine which is operable to extract the validation data from the selected bits, to form a normalised version of the validated compression encoded data by setting the selected bits in the validated compression encoded data to a predetermined value, and to calculate a hash value of the normalised version of the validated compression encoded data. The decoding apparatus then compares the extracted validation data with the calculated hash value and verifies the protected compression encoded data being as valid if the validation data and the calculated hash value match.

Further respective aspects and features of the present invention are defined in the appended claims and include encoding and decoding methods, computer software and a data bearing medium.

BRIEF DESCRIPTION OF THE DRAWINGS

Embodiments of the invention will now be described, by way of example only, with reference to the accompanying drawings in which:

FIGS. 10A and 10B schematically illustrate example candidate codes suitable for storing validation bits.

DESCRIPTION OF EXAMPLE EMBODIMENTS

Figure 1:
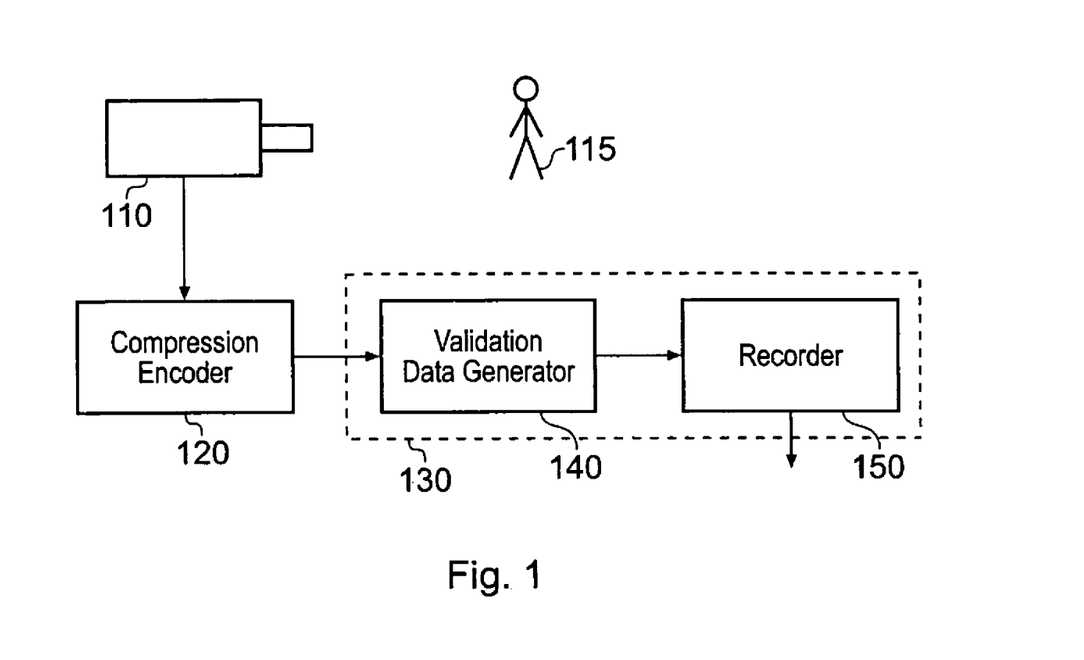
FIG. 1 schematically illustrates an example apparatus for recording and encoding video information.

FIG. 1 schematically illustrates an example apparatus for recording and encoding video information. The apparatus comprises a video camera 110 operable to generate a video signal corresponding to a scene 115, a compression encoder 120 for receiving the video signal from the video camera 110 and compression encoding it to form compressed video data, thereby reducing the volume of data to be communicated, and a validator 130 for generating validation data, embedding it into the compressed video signal and communicating the compressed video signal and validation data to a receiving apparatus (to be described later with reference to FIG. 7). The validator 130 comprises a validation data generator 140 for generating validation data from the compressed video data and a recoder 150 for generating protected compressed video data comprising the compressed video data and the validation data, and for communicating the protected compressed video data to a receiving apparatus.

An example apparatus for embedding validation data into a compressed bitstream is illustrated schematically in FIG. 2 and corresponds to the validator 130 described with reference to FIG. 1. The apparatus of FIG. 2 comprises an analyser 210 which receives a compressed bitstream 205 comprising codes, such as the compressed bitstream generated by the compression encoder 120 of FIG. 1. The analyser 210 identifies candidate bits within the bitstream which are to be modified by replacing them with validation data. Specifically, the analyser 210 identifies candidate codes within the bitstream which are to be modified by replacing one or more least important bits of the code with validation data. These least important bits are the candidate bits, and these candidate bits within the candidate code should be those bits that will have the smallest effect on the meaning of the candidate code when decoded. In some compression schemes these least important bits may be the least significant bits (LSBs) of the code, but in other compression schemes the least important bits may be present at other positions within the candidate codes. The analyser 210 outputs selection data corresponding to the identified candidate codes.

The candidate codes selected will be those the alteration of which would have an acceptably small effect on the information contained in the bitstream, and would preferably be those codes the alteration of which would have the smallest effect on the information contained in the bitstream. The compressed bitstream, along with the candidate code selection data generated by the analyser 210, is passed to an information validation engine 220 where validation data will be generated and embedded into the bitstream. Specifically, the information validation engine comprises a normaliser 230, which receives the compressed bitstream and the candidate code selection data from the analyser 210 and generates a normalised bitstream by setting the one or more candidate bits of each candidate code to a predetermined value. It will be appreciated that all candidate bits within the normalised bitstream could be set to a single value, such as zero or one, or alternatively could be set to values such as zero or one in accordance with a predetermined pattern, for instance by alternating between zero and one over a series of candidate bits.

The normalised bitstream is passed to a hash calculator 240 which generates a hash from the normalised bitstream. The calculated hash is then passed to an encryption module 260 which encrypts the hash using a supplied private key 250 to generate a signed hash. The normalised bitstream from the normaliser 230 and the signed hash from the encryption module 260 are then both passed to an embedder 270 where the normalised candidate bits in the normalised bitstream are replaced with respective bits of the signed hash to generate a protected compressed bitstream 280. The purpose of the signed hash embedded within the protected compressed bitstream 280 is to enable verification that no changes have been made to the protected compressed. bitstream 280 after the signed hash has been embedded into it. Encrypting the hash to generate the signed hash makes the system secure by inhibiting any attempts to tamper with the hash value within the protected compressed bitstream, although results in a greater amount of data being embedded into the bitstream. Other hash operations are also possible, and can result in data being embedded into the bitstream. For instance, running hashes of two or more successive data blocks can be generated to prevent blocks of data from being cut from the bitstream or moved to other areas of the bitstream. Additionally, hashes can be taken of successive hashes generated in respect of successive blocks of data.

Figure 2:
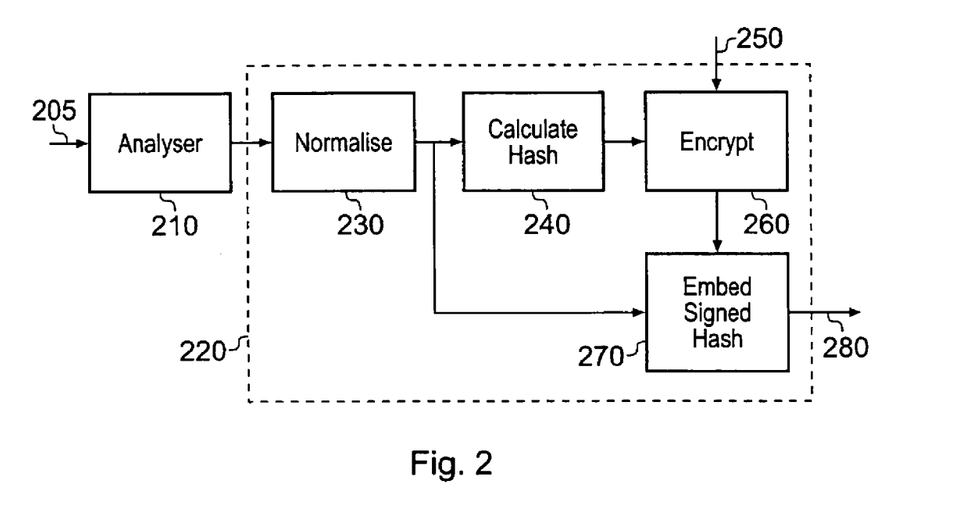
FIG. 2 schematically illustrates a validation data embedder suitable for use with the apparatus of FIG. 1.
Figure 3:
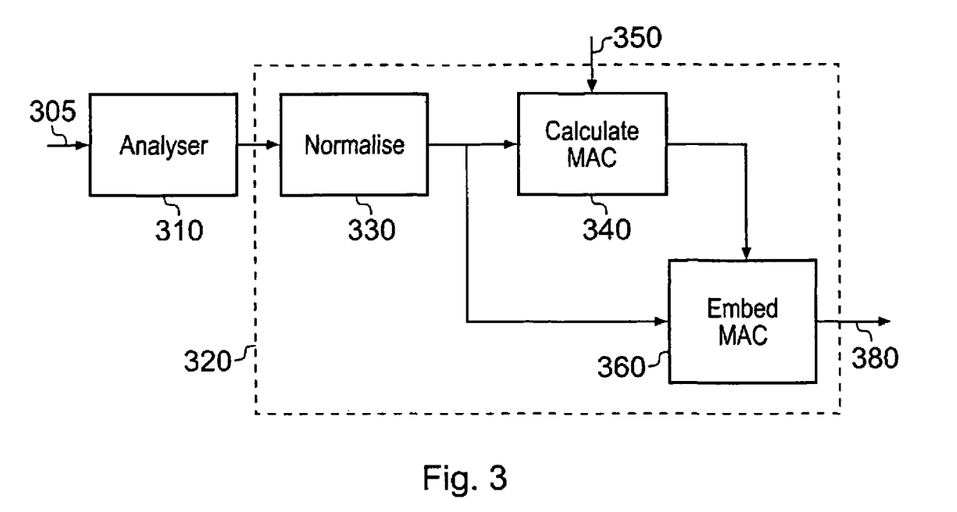
FIG. 3 schematically illustrates an alternative validation data embedder suitable for use with the apparatus of FIG. 1.

Referring to FIG. 3, an alternative apparatus for embedding validation data into a compressed bitstream is illustrated schematically and corresponds to the validator 130 described with reference to FIG. 1. The apparatus of FIG. 3 comprises an analyser 310 which receives a compressed bitstream 305 and generates candidate selection data based on the compressed bitstream 305. The analyser 310 corresponds to, and performs the same basic function as, the analyser 210 of FIG. 2 and will not be described again in detail. The bitstream analysed by the analyser 310 and the corresponding candidate code selection data are passed to an information validation engine 320 where validation data will be generated and embedded into the bitstream. Specifically, the information validation engine 320 comprises a normaliser 330, which receives the compressed bitstream and the candidate code selection data from the analyser 310 and generates a normalised bitstream by setting the one or more candidate bits of each candidate code to a predetermined value. The normaliser 330 corresponds to, and performs the same basic function as, the normaliser 230 described with reference to FIG. 2 and will not be described again in detail.

The normalised bitstream is passed to a message authentication code (MAC) calculator 340 which generates a MAC from the normalised bitstream using a supplied secret key 350. A MAC is a type of keyed hash which unlike the standard hash described above is generated not only on the basis of an input bitstream, but also on the basis of a secret key. Accordingly, this techique does not require an encryption module to encrypt the message authentication code because it is already encrypted at the time of its creation. The normalised bitstream from the normaliser 330 and the MAC from the message authentication code calculator 34 are then both passed to an embedder 360 where the normalised candidate bits in the normalised bitstream are replaced with respective bits of the MAC to generate a protected compressed bitstream 380. As with the signed hash of FIG. 2, the message authentication code embedded within the protected compressed bitstream 380 enables verification that no changes have been made to the protected compressed bitstream 380 after the message authentication code has been embedded into it.

Figure 4:
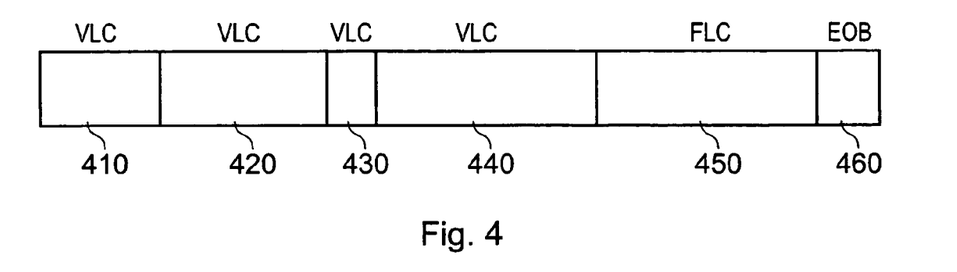
FIG. 4 schematically illustrates a small section of a compressed bitstream.

Referring to FIG. 4, an example MPEG-2 bitstream fragment is schematically illustrated and comprises four variable length codes (VLCs) 410, 420, 430 and 440, one fixed length code (FLC) 450 and one end of block code (EOB) 460. Although the example bitstream fragment is an MPEG-2 bitstream fragment, alternative data formats for video data, audio data, or other data, may also be used. Variable length codes may be of a variety of different lengths, depending on the information they represent. For instance, the variable length codes in MPEG-2 may range in length from 2 bits to 16 bits. However, fixed length codes in MPEG-2 always have a fixed length, of for instance 24 bits. Of the 24 bits of a fixed length code, the first 6 bits specify an escape code, the second 6 bits specify a run length of the fixed length code, and the final 12 bits specify a code value.

If validation data is to be inserted into the bitstream by replacing existing bits within the bitstream with validation bits, it is important to ensure that the resulting changes to the bitstream will have a relatively small effect on the information content represented by the bitstream. This can be achieved by identifying codes within the bitstream that correspond to large magnitude changes in the information represented by the bitstream and replacing the least significant bits (LSBs) of the identified codes with the validation bits. In the case of an MPEG-2 compressed bitstream, the bitstream comprises sequential blocks, each block comprising a sequence of codewords and representing a portion of an image frame. Each block within the bitstream is terminated with an end of block (EOB) code, any code following the end of block code relating to a subsequent block.

It should be recognised that the basic meaning of some variable length codes and most fixed length codes is maintained if the least significant (non-sign bit) is toggled to a different value. Specifically, in the case of a fixed length code, toggling the least significant bits of the code changes the code into another code of the same length (in bits) that also corresponds to the same run-length and, assuming the code comprises several or more bits, almost the same signal level. In the case of variable length codes, this principle will also apply, but only for certain predetermined variable length codes.

A number of factors help to determine which codes may be suitable candidates for replacement. For instance, longer codes tend to be good candidates for replacement, and fixed length codes (FLCs), due to the length of their code value portion (12 bits in the present case), are particularly good candidates, and may even allow two or more least significant bits to be replaced with validation data bits without introducing an unacceptable level of distortion. For instance, if the compression encoded data includes variable length codes which vary in length from 2 bits to 16 bits, and fixed length codes which always contain a code value portion of 12 bits in length, the data analyser may select candidate codes only from variable length codes exceeding 10 bits in length, or from any fixed length code within the block. It should be noted that end of block (EOB) codes should not be modified.

When selecting candidate codes, consideration should be given to any adaptive quantisation applied by the compression algorithm, in particular the degree of quantisation applied to each code. In the case of codes within an MPEG-2 bitstream, where the codes represent DCT (Discrete Cosine Transform) coefficients of a portion of an image, a code should only be selected for validation data insertion if it is determined that toggling the least significant bit will result in an acceptable change in the unquantised magnitude of the DCT coefficients. Accordingly, DCT coefficients which have been heavily quantised may be less suitable than similar DCT coefficients which have been less heavily quantised. In MPEG-2, the quantisation settings identifying the quantisation levels applied to DCT coefficients within the bitstream are generally available within the header portion of each block of data and can be extracted without fully decoding the bitstream. Accordingly, when selecting candidate codes, preference may be given to codes having a quantisation level below a predetermined threshold, since the greater the level of quantisation applied to a code, the greater the impact will be on the unquantised version of the code if one of the bits of the code is changed. Accordingly, replacing least significant bits from codes which have been subject to a level of quantisation below a predetermined threshold may result in less noticeable changes to the visual images.

With MPEG-2, the perceptibility of the information content of a block generally reduces from the first code in the block, which relates to the DC coefficient of the block, to the last code in the block, which relates to the least perceptible non-zero AC coefficient in the block. This characteristic is a result of the quantisation matrices used in MPEG-2 and also because in general, typical video imagery is predominantly described by the lower frequency coefficients positioned towards the start of each block. Accordingly, when selecting candidate codes, preference may be given to codes near the end of each block.

A combination of some or all of these approaches can be combined to produce better results. For instance, codes might be chosen using hierarchical selection logic which determines whether a given code satisfies certain criteria such as minimum code length, maximum applied quantisation and the position of the code within a current block. These criteria might be defined independently such that the threshold values used are fixed, and a code must satisfy one or more of them, or potentially all of them, to be selected as a candidate code. Alternatively, the criteria may interact with each other. Providing interacting criteria may be advantageous in circumstances where, for instance, it is desirable for a code comfortably satisfying one criteria to be allowed to marginally fail on another criteria and still be selected as a candidate code. As an example, a first code may have a low level of quantisation and may accordingly be selected as a candidate code if it has a length of greater than 10 bits, whereas a second code may have a higher level of quantisation than the first code and may accordingly be selected as a candidate code only if it has a length of greater than 13 bits.

Rather than determining candidate codes using hierarchical logic, possible values or ranges of each criteria may be tabulated into a look up table, the look up table specifying for each combination of values for the various criteria whether or not a code should be selected as a candidate code. Alternatively, one or more mathematical expressions may be defined which operate on parameters such as code length (in bits), quantisation level applied and related to this, the position of the code in the block, to evaluate whether or not a code should be selected as a candidate code.

The process of looking for candidate codes can either terminate when enough candidates have been found, which results in the selection operation being completed quickly, or continue over the data for an entire image frame, replacing candidates found earlier by new candidates which are better, that is, codes which when modified will produce less noticeable distortion, which may result in less distortion of the information content of the compression encoded data.

While it will be appreciated that the compression encoded data could represent any kind of information, and could be encoded using a number of different encoding methods and algorithms, preferably the compression encoded data is MPEG-2 encoded video data.

Figure 5:
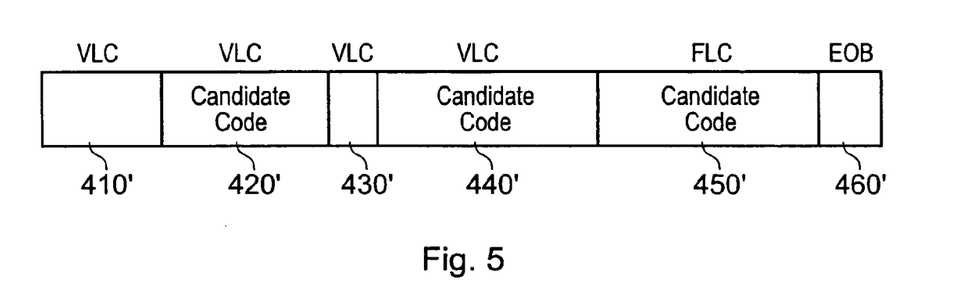
FIG. 5 schematically illustrates candidate codes within the bitstream of FIG. 1 which have been selected to store validation bits.

Referring to FIG. 5, applying the above candidate code selection methods may result in certain codes within the bitstream being marked as candidate codes. One or more least significant bits of these codes can be used to store the validation bits which make up the validation data. As can be seen from FIG. 5, the variable length codes 420' and 440' and the fixed length code 450' have been selected as candidate codes, whereas the variable length codes 410' and 430', and the end of block code 460' have not been selected as candidate codes and will therefore not be modified.

The validation data to be inserted into the bitstream comprises hash data generated by taking a hash of the compressed bitstream. Hash data is generated using a mathematical formula such as the SHA-1 algorithm (defined by the Secure Hash Standard (SHS) [National Institute of Standards and Technology (NIST). FIPS Publication 180: Secure Hash Standard (SHS). May 1993 & Updated May 1994]). The SHA-1 hash algorithm converts a string of bits of any length into a unique fixed-length string of digits (typically 160 bits) known as "message digest" that represents the original message. Accordingly, if a hash of a bitstream is generated before and then after modification of the bitstream, different hash values will be generated in each of these cases. In the present context this would appear to make the value of the hash questionable, since after generating a hash from the bitstream, the bitstream will be modified by embedding the hash data into it, and so a hash generated from the modified bitstream at a later date will differ to the hash generated from the original bitstream, and so comparison of the two hashes would always result in a discrepancy.

Figure 6:
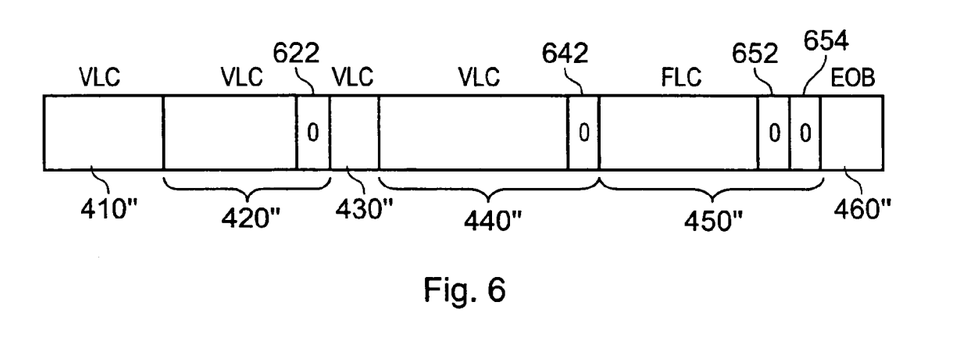
FIG. 6 schematically illustrates the preparation of a normalised version of the bitstream of FIG. 5.

Referring to FIG. 6, this problem is addressed by setting the candidate bits to a predetermined value, for instance zero, before generating a hash of the bitstream. In FIG. 5, it can be seen that no candidate bits are present in codes 410", 430" and 460", because these are not candidate codes, whereas an LSB 622 has been set to zero in a candidate variable length code 420", an LSB 642 has been set to zero in a candidate variable length code 440", and two LSBs 652, 654 have been set to zero in a candidate fixed length code 450". Then, after the hash has been generated, the hash data can be inserted into the candidate bits as validation bits. When the bitstream is to subsequently be tested for its authenticity, the validation data can be extracted from the bitstream, the candidate bits can be reset to the same predetermined value, and a hash can then be generated of the bitstream. Assuming no additional modifications have been applied to the bitstream, the newly generated hash will be identical to the hash embedded in the bitstream, and the bitstream will therefore be determined as authentic.

Figure 7:
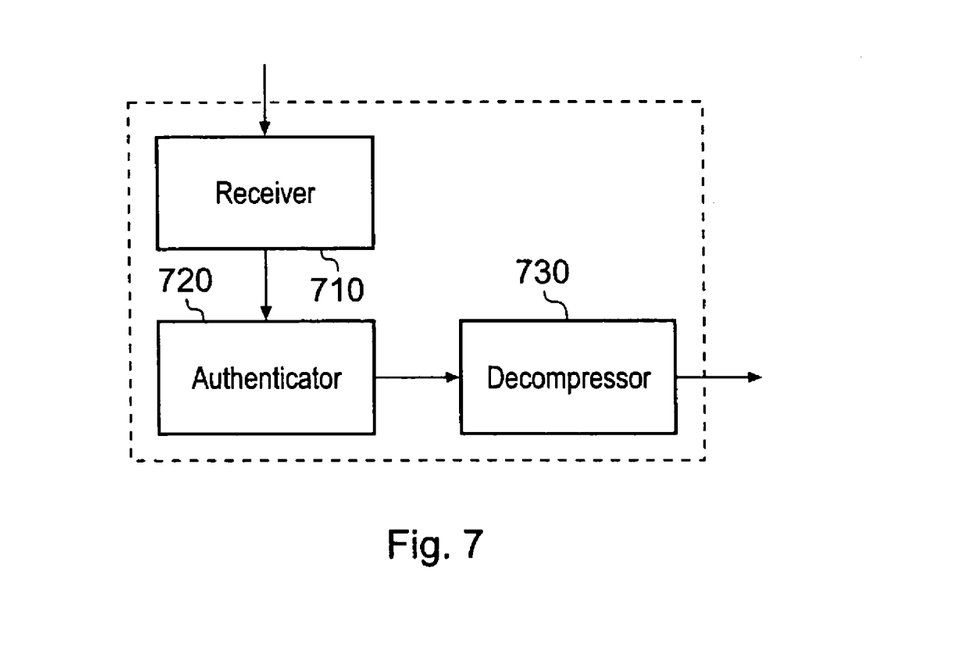
FIG. 7 schematically illustrates an example apparatus for receiving and decoding validated video information, such as that generated by the apparatus of FIG. 1.

FIG. 7 schematically illustrates an example apparatus for receiving and decoding protected video information, such as the protected compressed video data generated by the apparatus described with reference to FIG. 1. The apparatus comprises a receiver 710 for receiving protected video information, an authenticator 720 for determining, using the validation data within the protected video information, whether the received video information has been altered, and a decompressor 730 for decompressing the protected video information if the authenticator 720 determines that it has not been altered. The decompressed video information can be made available for viewing or transmission to another apparatus.

Figure 8:
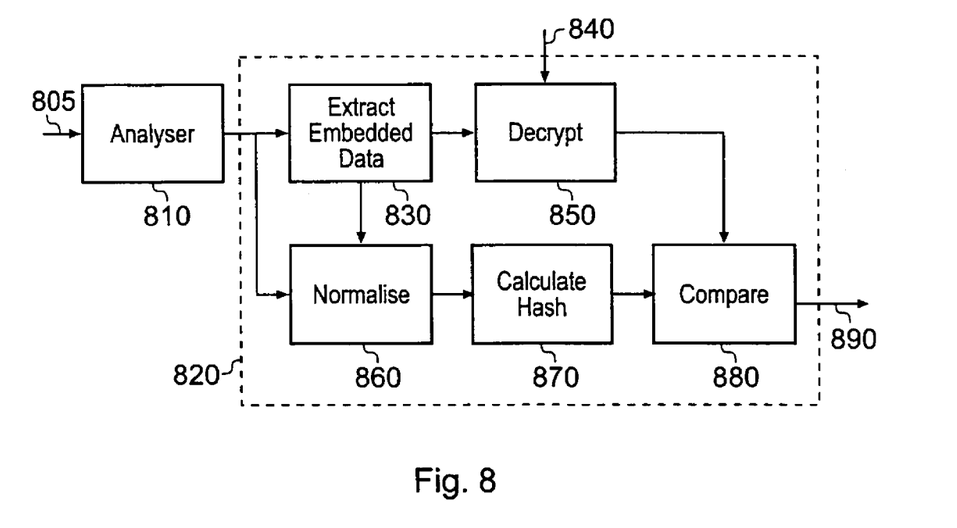
FIG. 8 schematically illustrates an authenticator suitable for use with the apparatus of FIG. 7.

An example detector operable to detect validation data, in particular signed hash data, stored in a protected compressed bitstream is illustrated schematically in FIG. 8. A protected compressed bitstream 805, such as the protected bitstream 280 generated by the information validation engine 220 of FIG. 2, is received at an analyser 810. The analyser 810 uses the same criteria as the analyser 210 of FIG. 2 to determine candidate codes where validation bits should be present in an authentic bitstream. Accordingly, the same candidate bits should be identified as with the embedding apparatus of FIG. 2. Candidate selection data will then be generated. The detector also includes an authentication engine 820 where validation data present in the protected bitstream will be detected and compared with newly generated validation data to determine whether any alteration to the bitstream has occurred and therefore whether the bitstream is authentic. The authentication engine 820 comprises a validation data extractor 830 which extracts validation data from the candidate bits determined by the analyser 810 from the protected compressed bitstream. The extracted validation data, which comprises a signed hash, such as that generated by the encryption module 250 in FIG. 2, is then passed to a decryption module 850 which decrypts the extracted validation data using a public key 840 corresponding to a private key such as the private key 250 used to encode the hash in the embedding apparatus of FIG. 2.

The authentication engine 820 also comprises a normaliser 830 which receives the protected compressed bitstream and the candidate bit selection data from the analyser 810 and sets the value of the candidate bits within the received bitstream to the same predetermined values as used in the normaliser 210 of the embedding apparatus of FIG. 2, and thus forming a normalised bitstream. The normalised bitstream is passed to a hash calculator 870 which generates a hash from the normalised bitstream. Although in the present example the analyser 810 and the normaliser 830 determine the candidate codes within the protected bitstream by directly applying the same criteria as applied during the embedding procedure, it will be appreciated that identifying code could be provided in the protected bitstream which identifies the positions of the candidate codes. In this case the analyser would determine the candidate bits meeting the predetermined criteria by reading the identifying code from the bitstream.

The decrypted hash from the decryption module 850 and the calculated hash from the hash calculator 870 are passed to a comparison module 880 which compares the two hashes and evaluates the compressed bitstream as authentic if the two hashes are found to be identical. An indication of the authenticity of the compressed bitstream is output as an authentication signal 890. The authentication signal 890 can be used to trigger or prevent further operations on or in respect of the compressed bitstream.

Figure 9:
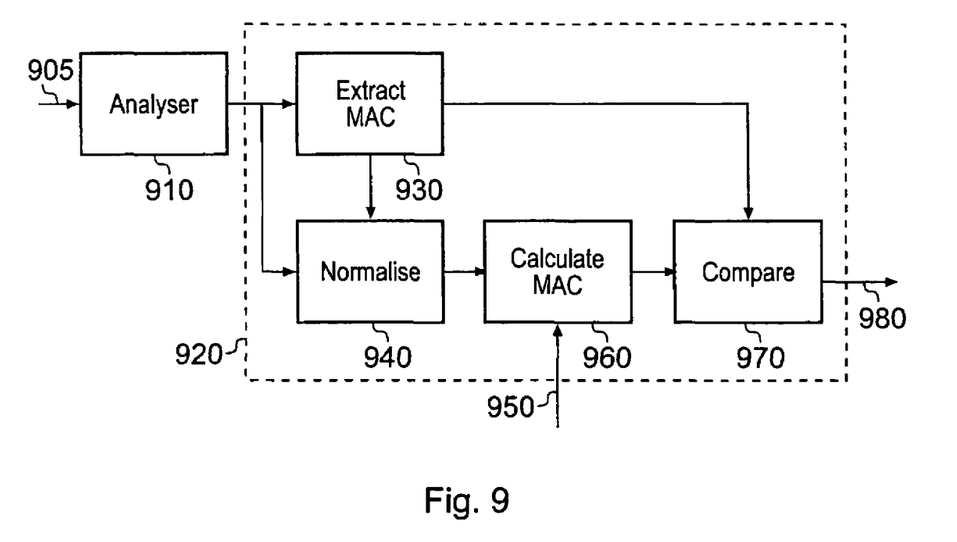
FIG. 9 schematically illustrates an alternative authenticator suitable for use with the apparatus of FIG. 7.

An alternative detector operable to detect validation data, in particular message authentication codes stored in a protected compressed bitstream, is illustrated schematically in FIG. 9. A protected compressed bitstream 905, such as the protected bitstream 380 generated by the information validation engine 320 of FIG. 3, is received at an analyser 910. The analyser 910 uses the same criteria as the analyser 310 of FIG. 3 to determine candidate codes where validation bits should be present in an authentic bitstream. Accordingly, the same candidate bits should be identified as with the embedding apparatus of FIG. 3. Candidate selection data will then be generated. The detector also includes an authentication engine 920 where validation data present in the protected bitstream will be detected and compared with newly generated validation data to determine whether any alteration to the bitstream has occurred and therefore whether the bitstream is authentic. The authentication engine 920 comprises a validation data extractor 930 which extracts the validation data from the candidate bits determined by the analyser 910 from the protected compressed bitstream. In this example, the validation data comprises a message authentication code, such as that generated by the message authentication code calculator 340 in FIG. 3. The alternative methods of determining candidate codes described above with reference to FIG. 8 are equally applicable to the present example arrangement.

The authentication engine 920 also comprises a normaliser 930 which receives the protected compressed bitstream and the candidate bit selection data from the analyser 910 and sets the value of the candidate bits within the received bitstream to the same predetermined values as used in the normaliser 310 of the embedding apparatus of FIG. 3, and thus forming a normalised bitstream. The normalised bitstream is passed to a message authentication code calculator 960 which generates a message authentication code from the normalised bitstream using a secret key 950 which is identical to the secret key 350 used in FIG. 3.

The message authentication code extracted by the validation data extractor 930 and the message authentication code calculated by the message authentication code calculator 960 are then compared by a comparison module 970. If the comparison module 970 determines that the two message authentication codes match, then the protected compressed bitstream is determined to be authentic. An indication of the authenticity of the compressed bitstream is output as an authentication signal 980. The authentication signal 980 can be used to trigger or prevent further operations on or in respect of the compressed bitstream.

While it is not necessary to insert validation data into every block within a bitstream of video signals, it is desirable to insert validation data into a picture or group of pictures to be protected. It is possible, particularly with P-frames and B-frames within an MPEG-2 bitstream, that an insufficient number of candidate codes can be selected from that frame of video data. In such a case, it would be necessary to either loosen the criteria to selection of candidate codes, thus allowing a greater level of distortion of the image, or to simply not protect that frame. Therefore in some embodiments the hash value of the normalised bit stream may be calculated over a number of frames, such as for example an entire GOP. For this case the secure hash value may only be added to the I-frame of the GOP in which some candidate codes have been identified by the validation engine, and normalised for the generation of the hash value. As such it will be appreciated that the secure hash value could be generated for any amount of the compressed data, for example only a part of the compression encoded bit stream such as one region or frame of a GOP, a GOP or other part thereof. According to such embodiments the authentication engine of the decoding data processing apparatus is operable to recover the secure hash from the appropriate part of the compression encoded data stream.

FIGS. 10A and 10B are tables which illustrate potential candidate variable length codes within the MPEG-2 variable length coding scheme which may be altered without causing an unacceptable change to the level of the code. While both of these tables are used in MPEG-2, the table of FIG. 10A describes variable length codes used for coding non-intra block AC coefficients and under certain encoder conditions for intra block AC coefficients. In contrast, the table of FIG. 10B describes variable length codes used for coding intra block AC coefficients under other encoder conditions.

In the coding tables of FIGS. 10A and 10B, variable length codes terminate with a sign bit "s" which represents whether the value represented by the variable length code is positive or negative. A positive value may be represented by a sign bit of 0 and a negative value may be represented by a sign bit of 1 or vice versa With MPEG-2, it is the bit preceding the sign bit which will normally have the smallest impact on the level of the code value, and it will usually be this bit, and potentially one or more bits directly preceding this bit, which may be considered as candidate bits. Clearly, the sign bit itself cannot be changed without changing the fundamental meaning of the code. The potential candidate codes within the table of FIG.

10A are those within regions 1010, 1020, 1030, 1040 and 1050 of the coding table. The potential candidate codes within the table of FIG. 10B are those within regions 1060, 1070, 1080, 1090 and 1100 of the coding table.

With both FIGS. 1A and 10B, all of the regions containing potential candidate codes relate to codes having either a run length of 0 or 1. Each potential candidate code within one of these regions can be paired with at least one other variable length code in the same region having the same run length and comprising the same number of bits and differing only by one or more least significant (non-sign) bits. It can be seen that for run lengths of 2 to 31, there are no pairs of codes consisting of the same number of bits, and accordingly a change to any of these codes will result in either an illegal code, or a code that relates to a different run length. FIGS. 10A and 10B also specify an end-of-block code and an escape code, neither of which should be altered.

While these coding tables give an indication of those variable length codes which may make suitable candidate codes, certain code pairs within the marked regions of these tables may be more appropriate than other code pairs. Additionally, proper evaluation of the codes depends on other factors, notably the degree of quantisation applied to the code. These factors may be used in the selection process to rank potential candidate codes with respect to other potential candidate codes, final selection of the candidate codes being made on the basis of a ranked list. Under such a system, two codes which would appear to be ranked in a predetermined order when not taking account of quantisation may switch round to the opposite order when quantisation is taken into account.

Unlike variable length codes, most fixed length codes can be validly modified without changing the basic meaning of the code, generally by modifying one or more of the least significant bits of the code. Exceptional codes which cannot be modified include fixed length codes which when modified would result in the generation of illegal values. An example of such a code includes a fixed length code consisting solely of a run of zeros terminating in a 1, which if modified by changing the least significant bit from a 1 to a 0 would result in a code consisting solely of zeros, which is an illegal code within the MPEG-2 coding scheme. However, in general terms setting the least significant bit of a fixed length code to a predetermined value would result in at most a change in value of 1, for instance from a value of 13 to a value of 14. Further, if the two least significant bits of a fixed length code to a predetermined value or values would result in at most a change in value of 3, for instance from a value of 13 to a value of 16. For candidate fixed length codes having a very large value, and depending on the level of quantisation applied to the code, a larger number of candidate bits may be selected from that fixed length code.

Various further aspects and features of the present invention are defined in the appended claims. Various modifications can be made to the embodiments herein before described without departing from the scope of the present invention.

The invention claimed is:

1. An encoding data processing apparatus configured to generate protected compression encoded data representative of protected media signals, the apparatus comprising:
    a data analyzer configured to receive compression encoded data representative of the media signals and to select low perceptibility data bits in the compression encoded data which when altered would have a low perceivable effect on the media signals recovered from compression decoding the compression encoded data after the selected bits had been altered, the selected bits being selected in accordance with predetermined criteria,
    an information validation engine configured
        to form a normalised version of the received compression encoded data representative of the media signals by replacing each of the selected data bits in the compression encoded data with data bits of a fixed predetermined value, the fixed predetermined value of each of the selected data bits being chosen without regard to the value of the selected data bits of the compression encoded data,
        to generate a secure hash value of the normalised version of the received compression encoded data which includes, at the selected data bits representing said low perceptibility data bits, said fixed predetermined values and which is representative of the media signals, and
        to form the protected compression encoded data by replacing the selected data bits of the normalised compression encoded data with data bits of the secure hash value so that the secure hash value is derivable from the selected data bits in the protected compression encoded data.

2. An encoding data processing apparatus according to claim 1, wherein the secure hash value is a message authentication code generated by calculating the secure hash value with respect to both the normalised version of the compression encoded data and a secret key.

3. An encoding data processing apparatus according to claim 1, wherein the secure hash value is generated by calculating a hash value with respect to the normalised version of the compression encoded data, and then encrypting the calculated hash value using a private key.

4. An encoding data processing apparatus according to claim 1, wherein the compression encoded data comprises one or more blocks of data, each block comprising one or more codes, each code comprising one or more sequential data bits, and wherein the data analyser is configured to select candidate codes in accordance with the predetermined criteria, the low perceptibility bits being selected from the candidate codes.

5. An encoding data processing apparatus according to claim 4, wherein the candidate codes meet predetermined length requirements, so that the candidate codes are codes which exceed 10 bits in length.

6. An encoding data processing apparatus according to claim 4, wherein the candidate codes follow a predetermined position within a block of data. so that the candidate codes are not end-of-block codes.

7. An encoding data processing apparatus according to claim 4, wherein the candidate codes meet predetermined quantisation requirements, so that the candidate codes are codes which are subject to a level of quantisation below a predetermined threshold.

8. An encoding data processing apparatus according to claim 1, wherein the data analyser stops identifying selected data bits when a predetermined number of selected data bits have been identified.

9. An encoding data processing apparatus according to claim 1, wherein the data analyser is configured to discard selected data bits when new selected data bits are found which when altered would have a less perceivable effect on the media signals recovered from compression decoding the compression encoded data after the selected bits had been altered.

10. An encoding data processing apparatus according to claim 1, comprising:
    a compression encoder configured to receive media signals, to generate the compression encoded data from the media signals, and to communicate the compression encoded data to the data analyser.

11. An encoding data processing apparatus as claimed in claim 1, wherein the data analyser is configured to select low perceptibility data bits from a part of the bit stream, and the information validation engine is configured to form the normalised version by setting the selected data bits from the part of the bit stream to the predetermined value, to generate the secure hash value from the part of the normalised version of the bit stream and to form the protected version of the compression encoded data by replacing the selected data bits of the part of the bit stream with the data bits of the secure hash value.

12. An encoding data processing apparatus as claimed in claim 11, wherein the part of the bit stream is a Group of Pictures, or a frame within the Group of Pictures.

13. A decoding data processing apparatus configured to validate protected media signals by decoding protected compression encoded data representative of the protected media signals, the protected compression encoded data containing validation data, the validation data having been calculated by identifying selected data bits in the compression encoded data in accordance with predetermined criteria which when altered would have a low perceivable effect on the media signals, replacing each of the selected data bits with data bits of a fixed predetermined value, the fixed predetermined value of each of the selected data bits being chosen without regard to the value of the selected data bits of the compression encoded data, to form a normalised version of the received compression encoded data representative of the media signals, calculating a secure hash value of the normalised version of the received compression encoded data which includes, at the selected data bits representing said low perceptibility data bits, said fixed predetermined values and which is representative of the media signals and replacing the selected data bits of the normalised version of the compression encoded data with the data bits of the secure hash value to form the protected compression encoded data so that the secure hash value is derivable from the selected data bits in the protected compression encoded data, the apparatus comprising:
a data analyzer configured to receive the protected compression encoded data and to identify selected data bits in the protected compression encoded data in accordance with the predetermined criteria,
an authentication engine configured
to extract the validation data from the selected bits,
to form a normalised version of the validated compression encoded data representative of the media signals by setting the selected bits in the validated compression encoded data to the fixed predetermined value,
to calculate a hash value of the normalised version of the validated compression encoded data representative of the media signals, and
to compare the extracted validation data with the calculated hash value, the protected compression encoded data being verified as valid when the validation data and the calculated hash value match.

14. A decoding data processing apparatus according to claim 13, wherein the secure hash value within the validated compression encoded data is a message authentication code generated by calculating the hash value with respect to both the normalised version of the compression encoded data and a secret key, and wherein the hash value calculated by the authentication engine is a message authentication code generated by calculating the hash value with respect to both the normalised version of the compression encoded data and the secret key.

15. A decoding data processing apparatus according to claim 13, wherein the secure hash value in the validated compression encoded data has been generated by calculating a hash value with respect to a normalised version of the compression encoded data, and then encrypting the calculated hash value using a private key, and wherein the authentication engine is configured to decrypt the validation data using a public key corresponding to the private key to recover the hash value within the validation data, and to compare the recovered hash value with the calculated hash value.

16. A decoding data processing apparatus according to claim 13, wherein the compression encoded data comprises one or more blocks of data, each block comprising one or more codes, each code comprising one or more sequential data bits, and wherein the data analyser is configured to select candidate codes in accordance with the predetermined criteria, the low perceptibility bits being selected from the candidate codes.

17. A decoding data processing apparatus according to claim 16, wherein the candidate codes meet predetermined length requirements, so that the candidate codes are codes which exceed 10 bits in length.

18. A decoding data processing apparatus according to claim 16, wherein the candidate codes follow a predetermined position within a block of data, so that the candidate codes are not end-of-block codes.

19. A decoding data processing apparatus according to claim 16, wherein the candidate codes meet predetermined quantisation requirements, so that the candidate codes are codes which are subject to a quantisation below a predetermined threshold.

20. A decoding data processing apparatus according to claim 13, wherein the data analyser stops identifying selected data bits when a predetermined number of selected data bits have been identified.

21. A decoding data processing apparatus according to claim 13, wherein the data analyser is configured to discard selected data bits when new selected data bits are found which when altered would have a less perceivable effect on the media signals recovered from compression decoding the compression encoded data after the selected bits had been altered.

22. A decoding data processing apparatus as claimed in claim 13, wherein the validation data has been determined by identifying selected data bits in a part of the compression encoded data in accordance with the predetermined criteria, the selected data bits in the part of the compression encoded data being normalised for the calculation of the secure hash value and replaced with the data bits of the secure hash value, the authentication engine being configured
to extract the validation data from the selected bits of the part of the compression encoded data,
to form the normalised version of the validated compression encoded data by setting the selected bits in the part of the validated compression encoded data to the predetermined value,
to calculate a hash value of the part of the normalised version of the validated compression encoded data, and
to compare the extracted validation data with the calculated hash value, the protected compression encoded data being verified as valid if the validation data and the calculated hash value match.

23. A decoding data processing apparatus as claimed in claim 22, wherein the part of the bit stream is a Group of Pictures, or a frame within the Group of Pictures.

24. An encoding data processing method for generating protected compression encoded data representative of protected media signals, the method comprising:

receiving compression encoded data representative of the media signals, identifying selected data bits in the received compression encoded data which when altered would have a low perceivable effect on the media signals recovered from compression decoding the received compression encoded data after the selected bits had been altered, the selected bits being selected in accordance with predetermined criteria, forming a normalised version of the received compression encoded data representative of the media signals by replacing each of the selected bits in the compression encoded data with data bits of a fixed predetermined value, the fixed predetermined value of each of the selected data bits being chosen without regard to the value of the selected data bits of the compression encoded data, calculating a secure hash value of the normalised version of the received compression encoded data which includes, at the selected data bits representing dais low perceptibility data bits, said fixed predetermined values and which is representative of the media signals, and forming the protected compression encoded data by replacing the selected data bits of the normalised compression encoded data with data bits of the secure hash value so that the secure hash value is derivable from the selected data bits in the protected compression encoded data.

25. An encoding data processing method according to claim 24, wherein the secure hash value is a message authentication code generated by calculating the secure hash value with respect to both the normalised version of the compression encoded data and a secret key.

26. An encoding data processing method according to claim 24, wherein the secure hash value is generated by calculating a hash value with respect to the normalised version of the compression encoded data, and then encrypting the calculated hash value using a private key.

27. A decoding data processing method for validating protected media signals by decoding protected compression encoded data representative of the media signals, the compression encoded data containing validation data, the validation data having been calculated by identifying selected data bits in the compression encoded data in accordance with predetermined criteria which when altered would have a low perceivable effect on the media signals, replacing each of the selected data bits with data bits of a fixed predetermined value, the fixed predetermined value of each of the selected data bits being chosen without regard to the value of the preselected data bits of the compression encoded data, to form a normalised version of the received compression encoded data, calculating a secure hash value of the normalised version of the compression encoded data which includes, at the selected data bits representing said low perceptibility data bits, said fixed predetermined values and replacing the selected data bits of the normalised version of the compression encoded data with the data bits of the secure hash value to form the protected compression encoded data so that the secure hash value is derivable from the selected data bits in the protected compression encoded data, the method comprising:

receiving the protected compression encoded data, identifying selected data bits in the protected compression encoded data in accordance with the predetermined criteria, extracting the validation data from the selected bits, forming a normalised version of the protected compression encoded data representative of the media signals by setting the selected bits in the protected compression encoded data to the fixed predetermined value, calculating a hash value of the normalised version of the protected compression encoded data representative of the media signals, and comparing the extracted validation data with the calculated hash value, the protected compression encoded data being verified as valid when the validation data and the calculated hash value match.

28. A decoding data processing method according to claim 27, wherein the secure hash value within the validated compression encoded data is a message authentication code generated by calculating the hash value with respect to both the normalised version of the compression encoded data and a secret key, and wherein the calculated hash value is a message authentication code generated by calculating the hash value with respect to both the normalised version of the compression encoded data and the secret key.

29. A decoding data processing method according to claim 27, wherein the secure hash value in the validated compression encoded data has been generated by calculating a hash value with respect to a normalised version of the compression encoded data, and then encrypting the calculated hash value using a private key, and wherein the validation data is decrypted using a public key corresponding to the private key to recover the hash value within the validation data, the recovered hash value being compared with the calculated hash value.

30. A non-transitory computer readable storage medium encoded with a computer software having program code, which when loaded onto a data processor, causes the data processor to perform the method according to claim 24.

31. A non-transitory computer readable storage medium bearing computer program code, which when loaded onto a data processor performs the method according to claim 24.

32. A non-transitory computer readable storage medium according to claim 31, wherein the medium is a storage medium.

33. A non-transitory computer readable storage medium encoded with a computer program to generate a signal representative of protected compression encoded data representative of the media signals, the protected compression encoded data containing validation data, the validation data having been calculated by identifying selected data bits in the compression encoded data in accordance with predetermined criteria which when altered would have a low perceivable effect on the media signals, to replace each of the selected data bits with data bits of a fixed predetermined value, the fixed predetermined value of each of the selected data bits chosen without regard to the value of the selected data bits of the compression encoded data, to form a normalised version of the compression encoded data, to calculate a secure hash value of the normalised version of the compression encoded data which includes, at the selected data bits representing said low perceptibility data bits, said fixed predetermined values and to replace the selected data bits of the normalised version of the compression encoded data with the data bits of the secure hash value so that the secure hash value is derivable from the selected data bits in the protected compression encoded data.

34. The medium of claim 33, wherein a data carrier bearing a signal is generated from said signal representative of protected compression encoded data.

35. The method of claim 24, wherein a data carrier bearing protected compression encoded data is produced for the protected compression encoded data representative of protected media signals.

36. A data decoding processing apparatus according to claim 15, wherein the candidate codes follow a predetermined position within a block of data, so that the candidate codes are not end-of-block codes.

37. An encoding data processing apparatus according to claim 1, further comprising:
an analyzer configured to identify candidate codes within the bitstream, according to the predetermined criteria, which include one or more least significant bits and are modified by the information validation engine by replacing the least significant bits of the code with data bits of the secure hash value, and to output selection data corresponding to the identified candidate codes, wherein
the information validation engine is configured to receive the compressed bitstream and candidate code selection data from said analyzer.

38. A decoding data processing apparatus according to claim 13, further comprising:
an analyzer configured to identify candidate codes within the bitstream, according to the predetermined criteria, which include one or more least significant bits and are modified by the information validation engine by replacing the least significant bits of the code with data bits of the secure hash value, and to output selection data corresponding to the identified candidate codes, wherein
the authentication engine is configured to receive the compressed bitstream and candidate code selection data from said analyzer.

39. A encoding data processing method according to claim 24, further comprising:
identifying candidate codes within the bitstream, according to the predetermined criteria, which include one or more least significant bits and are modified by replacing the least significant bits of the code with data bits of the secure hash value, and
outputting selection data corresponding to the identified candidate codes, wherein the forming includes receiving the compressed bitstream and candidate code selection data from said identifying candidate codes step.

40. A decoding data processing method according to claim 27, further comprising:
identifying candidate codes within the bitstream, according to the predetermined criteria, which include one or more least significant bits and are modified by replacing the least significant bits with data bits of the secure hash value, and
outputting selection data corresponding to the identified candidate codes, wherein the forming includes receiving the compressed bitstream and candidate code selection data from said identifying candidate codes step.

41. The medium according to claim 33, wherein candidate codes of the compression encoded data, which include one or more least significant bits and are modified by replacing the least significant bits with data bits of the secure hash value, are identified according to the predetermined criteria.

42. An encoding data processing apparatus according to claim 6, wherein the candidate codes follow the predetermined position within a block of data so that the candidate codes are near the end-of-block codes.

43. An encoding data processing apparatus according to claim 4, wherein the predetermined criteria includes ranking factors, the ranking factors including code bit length, code position within a block of data, and a level of code quantisation.

44. An encoding data processing apparatus according to claim 43, wherein the candidate codes are selected based on a predetermined order of preference of the ranking factors.

45. An encoding data processing apparatus according to claim 44, wherein, based on the predetermined order of preference, candidate codes are selected which satisfy first criteria including at least one of: at least 10 bits in length, not an end-of-block code, and subject to a level of quantisation below a predetermined threshold.

46. An encoding data processing apparatus according to claim 45, wherein candidate codes are selected based on, in addition to and after satisfying the first criteria, satisfying second criteria including being nearest to the end-of-block codes.

47. An encoding data processing apparatus according to claim 43, wherein a length threshold value for the code bit length is related to a quantisation threshold value for the level of code quantisation, such that when a bit length of the particular code is greater than the length threshold value by a predetermined value, the quantisation threshold value is increased.

48. An encoding data processing apparatus according to claim 4, wherein the low perceptibility bits are least significant bits of the selected candidate codes.

49. An encoding data processing apparatus according to claim 48, wherein only one least significant bit of each of the selected candidate codes is replaced.

* * * * *